United States Patent [19]

Hollowell

[11] 4,239,260
[45] Dec. 16, 1980

[54] ADJUSTABLE EMERGENCY LOCKING BUCKLE ANCHOR

[75] Inventor: William M. Hollowell, Pacific Palisades, Calif.

[73] Assignee: American Safety Equipment Corporation, San Fernando, Calif.

[21] Appl. No.: 51,696

[22] Filed: Jun. 25, 1979

[51] Int. Cl.³ .............................................. B60R 21/10
[52] U.S. Cl. .................................. 280/806; 188/134; 280/805; 297/472; 297/473
[58] Field of Search .................. 280/801, 806, 805; 297/470, 471, 472, 480, 473; 188/67, 134

[56] References Cited

U.S. PATENT DOCUMENTS 3,557,914  1/1971  Tanaka .............................. 280/802 X

FOREIGN PATENT DOCUMENTS 2800261  7/1979  Fed. Rep. of Germany ........... 280/806

Primary Examiner—John A. Pekar
Attorney, Agent, or Firm—Poms, Smith, Lande & Rose

[57] ABSTRACT

An adjustable emergency locking anchor is provided for mounting a safety restraint system buckle adjacent a seat occupant's hip during fore and aft adjustment of the seat. The adjustable emergency locking anchor includes a channeled floor anchor plate having one end secured to the vehicle floor and the other end slidably receiving a buckle plate which has the safety restraint buckle secured to its outer end. The buckle plate is secured to the seat via a seat anchor plate which is superposedly mounted on the buckle plate for movement relative to the buckle plate in one direction only, that direction being toward pawls which are mounted on the buckle plate so as to engage the floor anchor plate when they are pivoted into position. The pawls are pivoted into locking position only when the seat plate moves to engage them, however, the movement of the seat plate is restricted by a blocking device which prevents movement of the seat plate relative to the buckle plate except upon the application of an emergency restraining force in excess of a predetermined amount to the buckle. In addition, the pawls are kept out of engagement with the floor anchor plate by a retaining device which is also released as the seat plate moves toward the pawls upon the application of an emergency restraining force in excess of a predetermined amount of the buckle.

11 Claims, 13 Drawing Figures

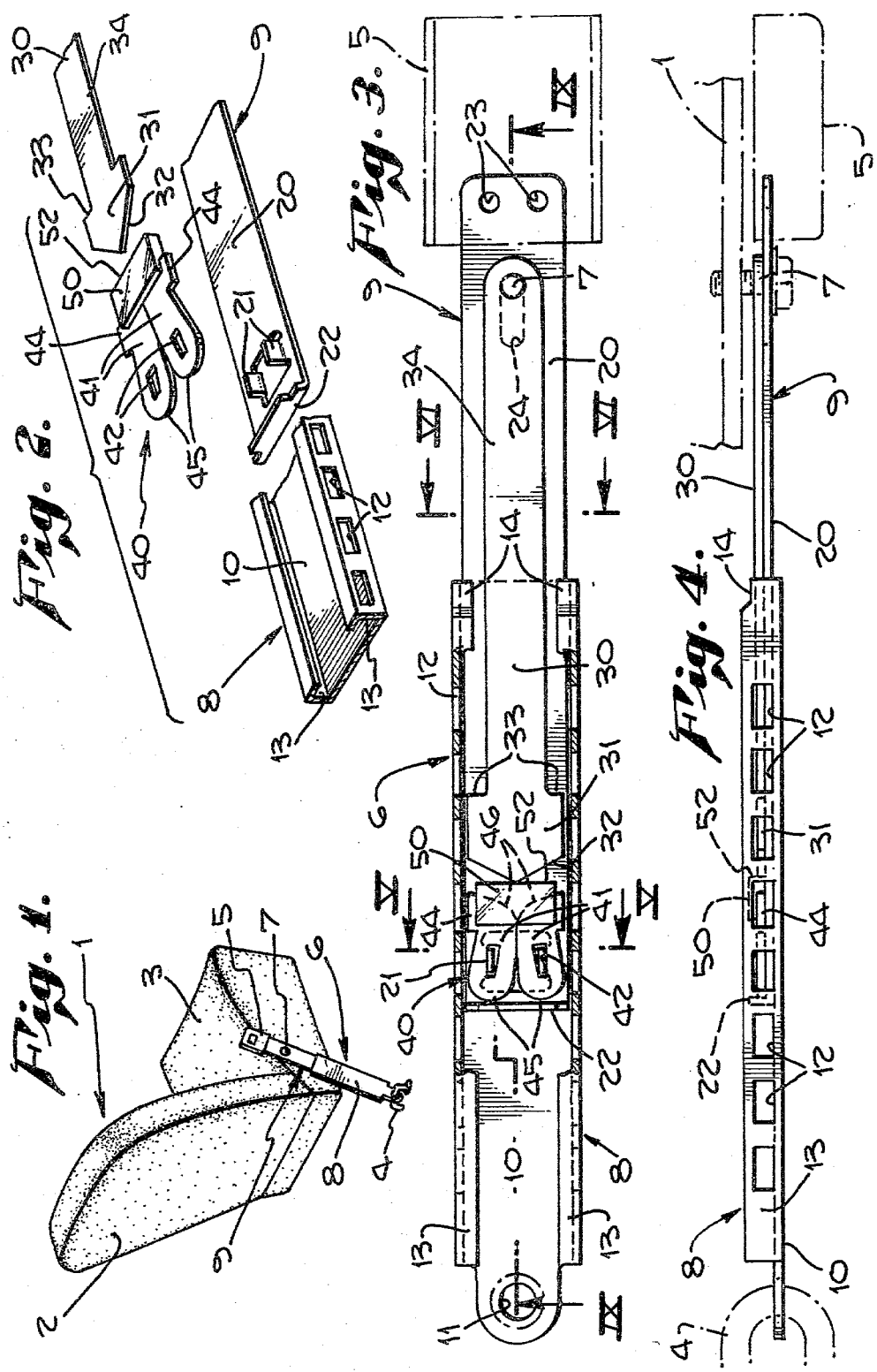

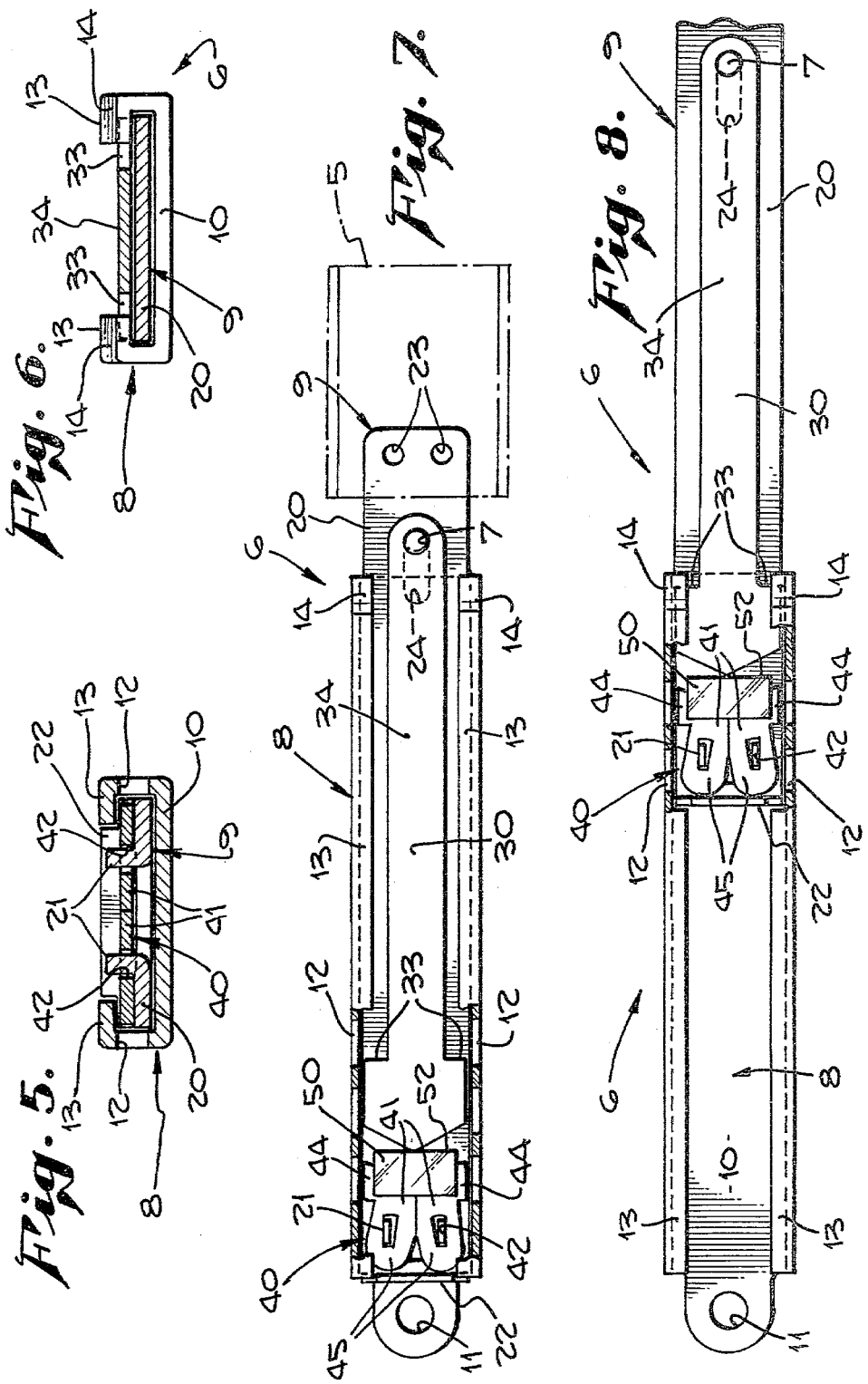

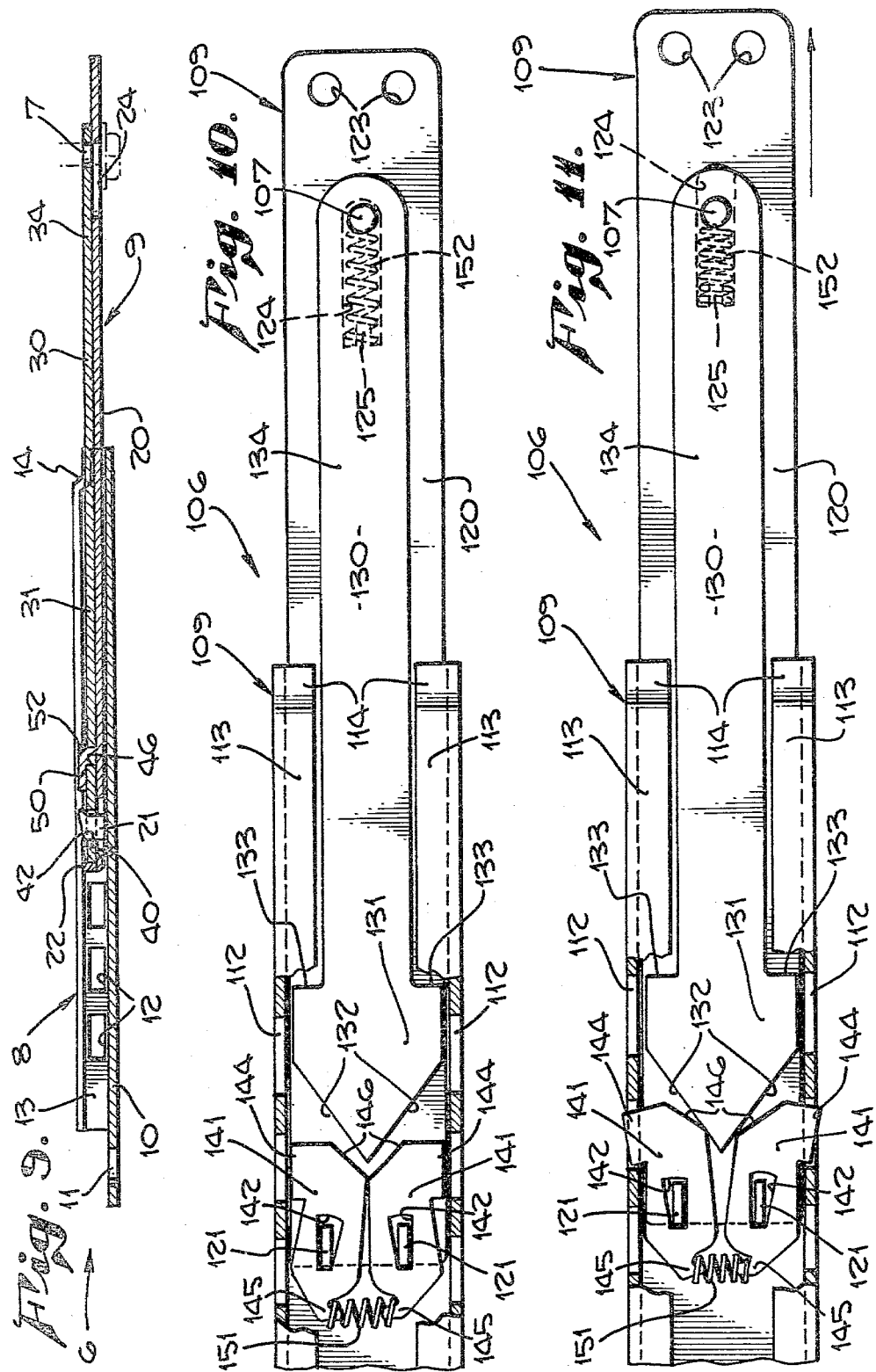

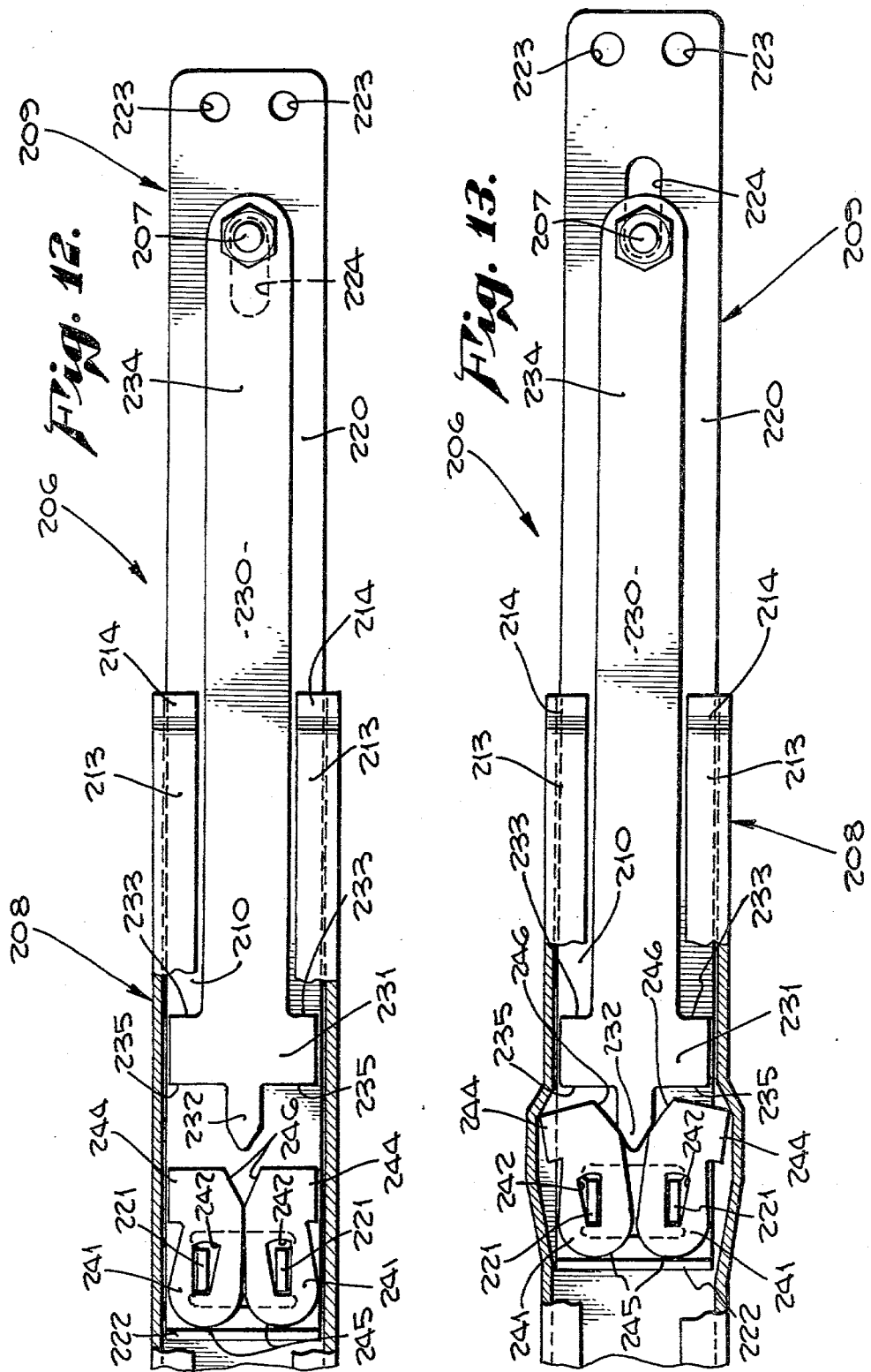

ADJUSTABLE EMERGENCY LOCKING BUCKLE ANCHOR

BACKGROUND OF THE INVENTION

The present invention relates to methods of anchoring safety restraint systems in all types of vehicles and in particular in conventional passenger automobiles.

Many conventional safety restraint systems have seat and shoulder harness belts retractably secured on one side of the vehicle seat passing over the occupant and being secured to a buckle on the opposing side of the seat which in turn is secured to the floor of the vehicle. It has been found to be particularly desirable to locate the buckle in a fixed relation as to the vehicle and at a location adjacent the seat occupant's hip in order to assure drawing the restraint systems lap and chest belts fully across the occupant. In automobiles with adjustable seats that may be adjusted fore and aft in the vehicle, a problem occurs where the buckle is secured to the floor in that as the seat is moved fore and aft, the buckle remains fixed to the floor of the vehicle and its relative position to a seat occupant's hip is changed. With the buckle changing positions relative to the seal occupant during seat adjustment, the seat occupant has to search for the buckle before releasing it or engaging it.

It would be preferred to have the buckle mounted on the seat thereby ensuring that the buckle does not change its position relative to the seat as it is adjusted fore and aft. By securing the buckle only to the seat, however, the safety advantages of having the buckle secured to the floor are no longer provided. It would, therefore, be desirable to have a buckle anchor which is secured to the seat for normal operation of the safety restraint system and additionally secured to the floor of the vehicle during the application of an emergency restraining force to the safety restraint system.

SUMMARY OF THE INVENTION AND ITS OBJECTIVES

Accordingly, it is an object of the present invention to provide an adjustable safety restraint anchoring system which remains anchored to the seat only during normal use of the restraint system while becoming anchored additionally to the floor during the application of an emergency restraining force greater than a predetermined amount to the safety restraint system.

It is another object of the present invention to provide a safety restraint system buckle which remains in the same position relative to an adjustable seat as it is moved fore and aft.

A further object of the present invention is to provide a safety restraint buckle anchor wherein the buckle remains close to the hip of a seat occupant for easy access during normal operation or during an emergency.

An additional object of the present invention is to provide an anchoring system for a safety restraint belt which provides the convenience of having the belt buckle secured to the seat while providing the safety of having the seat belt buckle secured to the floor of the vehicle during the application of emergency restraining forces to the safety restraint system.

These objects are achieved in accordance with the present invention by the provision of an adjustable emergency locking anchor apparatus including in a preferred embodiment a pair of relatively telescoping mounting members, a first member of the pair being secured to the vehicle floor adjacent the path of travel of the adjustable seat and a second member of the pair being secured to the safety restraint system buckle, the second member being anchored to the adjustable seat for normal concurrent movement thereby maintaining the buckle adjacent to a seat occupant's hip during fore and aft seat movement and a locking device for restricting the relative telescoping movement of the members when an emergency restraint force in excess of a predetermined amount is applied to the safety restraint buckle. This results in the safety restraint buckle being substantially connected to the seat only during normal operation of the safety restraint system and being anchored to the floor upon application of emergency restraining forces to the safety restraint system.

These and further objects and various advantages of the invention will become apparent to those skilled in the art from a consideration of the following detailed description of exemplary embodiment thereof. Reference will be made to the appended sheets of drawings which will first be discussed briefly.

BRIEF DESCRIPTION OF THE DRAWINGS

FIG. 1 is a perspective view of a preferred exemplary embodiment of the adjustable emergency locking anchor of the present invention shown in place adjacent an automobile seat;

FIG. 2 is a detailed exploded view of the central portion of the adjustable emergency locking anchor of FIG. 1;

FIG. 3 is a detailed plan view of the adjustable emergency locking anchor of FIG. 1;

FIG. 4 is a side view of the adjustable emergency locking anchor of FIG. 3;

FIG. 5 is a section view taken in the plane V—V of FIG. 3;

FIG. 6 is a section view taken in the plane VI—VI of FIG. 3;

FIG. 7 shows the adjustable emergency locking anchor of FIG. 1 in the fully contracted position;

FIG. 8 shows the adjustable emergency locking anchor of FIG. 1 in the fully extended position;

FIG. 9 is a section view taken in the plane IX—IX of FIG. 3;

FIG. 10 shows a first alternative exemplary embodiment of the adjustable emergency locking anchor of the present invention in an unlocked position;

FIG. 11 shows the adjustable emergency locking anchor of FIG. 10 in the locked position;

FIG. 12 shows a second alternative exemplary embodiment of the adjustable emergency locking anchor of the present invention in the unlocked position; and FIG. 13 shows the adjustable emergency locking anchor of FIG. 12 in the locked position.

DETAILED DESCRIPTION OF THE PREFERRED EMBODIMENTS

Referring first to FIG. 1, a vehicle seat is shown generally at 1 having a seat back 2 and a seat cushion 3. The preferred embodiment of the adjustable emergency locking anchor means is shown generally at 6 placed in a substantially fixed location relative to the vehicle seat 1 to be maintained adjacent the seat occupant's hip during fore and aft adjustment of the seat 1. The preferred embodiment of the adjustable emergency locking anchoring means is shown having a floor anchor means 8 for securing the buckle 5 to the vehicle floor only upon application of an emergency restraining force in excess of a predetermined amount to the buckle 5 and a seat anchor means 9 which is adjustably attached to the floor anchor means 8 at one end and connected to the buckle 5 on the other end for securing the buckle 5 to the seat 1 during application of normal restraining forces less than a predetermined amount whereby the buckle 5 is maintained in the same position relative to a seat occupant's hip as the seat 1 is adjustably moved fore and aft. The seat anchor means 9 is secured to the seat 1 at 7 with a bolt or other stud type connector. The floor anchor means 8 is secured to the vehicle floor via a floor anchor 4. The seat anchor means 9 and the floor anchor means 8 form a pair of relatively telescoping mounting members with the first member 8 of the pair being secured to the vehicle floor anchor 4 adjacent the path of travel of the seat 1 and a second member 9 of the pair being secured to the buckle 5 and the seat 1.

The following is a detailed description of the preferred exemplary embodiment of the adjustable emergency locking anchor means of the present invention. Reference will be made to FIGS. 2 through 9. The adjustable emergency locking anchor means 6 is composed of three major elements, a seat anchor means 9, a floor anchor means 8 and a locking means for locking the seat anchor means 9 to the floor anchor means 8 upon application of an emergency restraining force on the buckle 5 relative to the seat 1 of an amount in excess of a predetermined amount.

The seat anchor means 9 is adjustably attached to the floor anchor means 8 at one end by way of channels 13 on the floor anchor plate 10. Additionally, the seat anchor means 9 is connected to the buckle 5 on the other end for securing the buckle 5 to the seat 1 during application of normal restraining forces less than a predetermined amount. The seat anchor means is shown having a buckle plate 20, a seat anchor plate 30 and a blocking surface 52.

The buckle plate 20 is shown having one end attached to the buckle 5 at holes 23 by bolts, rivets or other securing means and the other end is slidably mounted to the floor anchor plate 10. A slot 24 in the buckle plate 20 provides for restrictive movement of the buckle plate 20 relative to its mounting bolt 7 on the seat 1. A seat anchor plate 30 is superposedly mounted on the buckle plate 20 having one end attached to the seat 1 at 7 with a bolt or other secure means to prevent the seat anchor plate 30 from moving relative to the seat. It can be seen that the buckle plate 20 with its slot 24 attachment to bolt 7 is allowed to move relative to the seat anchor plate 30 within the confines of the slot 24.

Blocking means are provided for preventing the relative movement of the seat anchor plate 30 with respect to the buckle plate 20 in one direction only. The blocking means is shown as an insert 50 composed of a frangible material such as plastic or other relatively easily broken material. The frangible insert 50 has a blocking surface 52 which contacts the wedge shaped head 31 of the seat anchor plate 30. The blocking surface 52 and the seat anchor plate 30 are positioned on the buckle plate 20 so that mounting bolt 7 is displaced fully to one corner of the slot 24 in the buckle plate 20. This provides for movement of the seat plate relative to the buckle plate in one direction only and in the preferred embodiment that direction is toward locking means 40. The blocking surface 52 is calibrated to break upon application of an emergency restraining force on the buckle 5 relative to the seat 1 of an amount in excess of a predetermined amount thereby allowing movement of the seat plate into the locking means 40. The buckle plate 20 has pawl tabs 21 for pivotally mounting the pawls 41 to the buckle plate 20. The pawl tabs 21 fit into slots 42 on the pawls 41. The pawl tabs 21 are shown in the preferred embodiment as tabs being formed out of the buckle plate 20, however, the pawls 41 may be mounted by any other convenient means such as a bolt or rivet so long as the pawls 41 are allowed to pivot freely. In addition, the buckle plate 20 has a pawl stop flange 22 to support the pawls 41 as they are moved against the seat anchor plate 30. Although the pawl tabs 21 would probably remain intact upon contact of the pawls 41 with the seat anchor plate, it is deemed necessary to have the pawl stop flange 22 present to ensure that the pawls cannot be moved longitudinally off of the buckle plate 20.

The seat anchor plate 30 functions as a connecting means for securing the seat anchor means 9 or second member to the seat 1 for normal concurrent movement to maintain the buckle 5 adjacent a seat 1 occupant's hip during fore and aft adjustment of the seat 1. This is evident since the buckle 5 is not secured to the seat 1 by the buckle plate 20 because of possible movement of the seat bolt 7 within the buckle plate slot 24. The seat anchor plate 30, however, is tightly secured to the seat bolt 7. The buckle plate 20 is indirectly secured to the seat bolt 7 by way of the frangible insert 50 which may be secured to the buckle plate 20 in any convenient manner.

In the preferred embodiment, the frangible insert is press fitted onto the pawls 41. With the seat anchor plate 30 superposedly mounted on the buckle plate 20 abutting the frangible insert 50 at blocking surface 52, the buckle 5 is secured to the seat bolt 7. The weak link in this securing connection is the frangible insert 50. Upon application of an emergency restraining force in excess of a predetermined amount to the buckle 5, the insert 50 breaks and the buckle plate 20 is momentarily not secured to the seat bolt 7. However, the pawls 41 are movably engaged to the floor anchor plate 10 to secure the buckle plate 20 to the vehicle floor anchor 4. Additionally, the buckle plate 20 becomes resecured to the seat bolt 7 as the bolt reaches the opposite end of the buckle plate slot 24. Also, the seat anchor plate 30 provides additional securing to the seat bolt 7 as it is forced against the pawls 41 at pawl surfaces 46. This provides an adjustable emergency locking anchoring means which is secured to the seat only for normal concurrent movement, but becomes attached to the seat and the floor during application of an emergency restraining force in excess of a predetermined amount to the buckle 5.

A floor anchor means for securing the buckle 5 to the vehicle floor anchor 4 only upon application of an emergency restraining force in excess of a predetermined amount to the buckle 5 is provided by the floor anchor plate 10. The preferred embodiment shows the floor anchor plate 10 having longitudinal channels 13 for slidably receiving the seat anchor means composed of the buckle plate 20, seat anchor plate 30, frangible insert 50 and the locking means 40 mounted on the buckle plate 20. In the preferred embodiment, slots 12 are provided along each channel 13 to provide locking engagement of the pawls 41 with the floor anchor plate 10. The floor anchor plate 10 is also provided with a mounting hole 11 for mounting to the floor anchor 4. The channels 13 on the floor anchor plate 10 are crimped as at 14 to prevent the seat anchor means 9 from being extended completely out of the floor anchor plate 10.

The seat anchor plate 30 is a single metal plate having a wedge shaped head 31 and a body 34. The wedge shaped head 31 is wider than the body 34. This provides for free telescoping movement within the floor plate channels 13 along the seat anchor plate body 34, while preventing extension of the seat anchor means 9 completely out of the floor anchor plate channels 13. This occurs because the abutting surfaces 33 on the wedge shaped head 31 are blocked by the crimped portion 14 of the floor plate channels 13 as shown in FIG. 8.

The final major element of this preferred embodiment is the locking means. The locking means is shown having pawl means such as pawls 41 with slots 42 for mounting on the buckle plate pawl tabs 21. The pawls 41 have rounded surfaces at 45 so that the pawls 41 can pivot against the stopping flange 22 when force is exerted against the pawls 41 by the seat anchor plate 30. The pawls 41 have locking arms 44 for engaging the slots 12 on the floor anchor plate 10. The particular slot 12 which the locking arms 44 engage depends upon the relative extension of the buckle plate 20 relative to the floor anchor plate 10. The pawls 41 are retained out of contact with the slots 12 by a retaining means such as frangible insert 50 where the frangible insert 50 is calibrated to break upon application of an emergency restraining force in excess of a predetermined amount to the buckle 5. The insert may be press fitted or tightly secured in any convenient manner to the pawls 41 so long as pivotal movement of the pawls 41 is prevented. It should be noted that in this preferred embodiment of the present invention, the frangible insert 50 performs two functions. The first function is as a blocking means for preventing relative movement of the seat anchor plate 30 with respect to the buckle plate 20. It also functions as a retaining means to retain the pawls 41 out of engagement with the floor anchor plate slots 12. Upon application of an emergency restraining force in excess of a predetermined amount to the buckle 5, both the blocking means and retaining means provided by the frangible insert 50 are simultaneously removed. Certainly two frangible inserts could be used to perform the above-described functions separately, however, in this preferred embodiment, a single frangible insert 50 is employed. In other words, the surface 52 of the frangible insert which abuts the wedge shaped head of the seat plate 31 is part of a means for connecting the seat anchor means or second member to the seat 1 for normal concurrent movement to maintain the buckle 5 adjacent a seat occupant's hip during fore and aft seat movement along the path of travel of the seat 1. When a force above a predetermined amount is exerted upon the buckle 5, this force is transferred to the buckle plate 20 which extends the length of the buckle plate slot 24 thereby pulling the frangible insert 50 against the seat plate 30 and breaking it. Once the frangible insert 50 is broken, the seat anchor plate moves against the pawls 41 along surfaces 32 thereby moving the pawls 41 laterally out into engagement with slots 12. Below the predetermined emergency restraining force, the frangible insert 50 remains intact thereby preventing movement of the seat anchor plate 30 relative to the buckle plate 20 so as to provide extension and retraction of the unit as a single seat anchor plate means 9. In normal operation, as the seat is adjusted forward the seat anchor bolt 7 is secured to the seat anchor plate 30 and is at its extreme forward extension in the buckle plate slot 24 thereby moving the buckle forward with the seat, as the seat is moved aft the seat anchor plate also moves aft since it is secured fixedly to the seat anchor bolt 7 while the buckle plate 20 would tend to remain in its extended position until the seat anchor bolt 7 reached the other end of the buckle slot 24. However, the blocking surface 52 which is placed in direct abutment with the seat anchor means 30 prevents the movement of the seat anchor bolt 7 to the other end of the buckle slot 24 except when the blocking surface 52 is broken upon the application of an emergency restraining force in excess of a predetermined amount to the buckle 5. This configuration provides a connecting means where the seat anchor means or second member 9 is attached to the seat 1 for normal concurrent movement to maintain the buckle 5 adjacent a seat occupant's hip during fore and aft seat movement.

FIRST ALTERNATIVE EXEMPLARY EMBODIMENT

Referring now to FIGS. 10 and 11, a first alternative exemplary embodiment of the present invention is shown wherein the same basic components of the preferred exemplary embodiment of the emergency locking anchor means are present, however, the frangible insert 50 has been replaced by a blocking spring 152 and a retaining spring 151. In addition, modifications to the wedge shaped head of the seat anchor plate 131, the pawls 141 and the buckle plate slot 124 are made. In the preferred exemplary embodiment of the present invention, the blocking and retaining means were both accomplished by a single frangible insert 50. In this alternative embodiment of the present invention, a spring 152 is placed longitudinally within the buckle plate slot 124 for preventing movement of the seat anchor plate 130 relative to the buckle plate 120 except upon application of an emergency restraining force in excess of a predetermined amount to the buckle 5. The buckle plate slot 124 is longer than the buckle plate slot 24 of the first preferred embodiment to allow for the presence of the spring 152 within the slot 124. Additionally, a spring tab 125 is present on the buckle plate 120 to maintain the spring within the slot 124. A retaining spring 151 is placed between the pawls 141 and held in place by spring retaining arms 145 to bias the locking arms 144 out of engagement with the floor plate slots 112. The wedge shaped head 131 of the seat anchor plate 130 is more pointed than the wedge shaped head 31 of the first preferred embodiment and the pawl surfaces 146 are not rounded. Also, it should be noted that the pawl slots 142 are shaped as are the pawl slots 42 to allow the pawls 141 to pivot outwardly about the pawl tabs 121 which are rectangular in shape. The main advantage of the second preferred embodiment of the present invention over the first preferred embodiment is that the blocking and retaining means are not frangible. This provides for reversible locking of the adjustable emergency locking anchor means in the second preferred embodiment which is not the case in the first preferred embodiment.

SECOND ALTERNATIVE EXEMPLARY EMBODIMENT

Referring to FIGS. 12 and 13, FIG. 12 shows the second alternative exemplary embodiment of the adjustable emergency locking means of the present invention in the unlocked position while FIG. 13 shows the adjustable emergency locking anchoring means in the locked position. This second alternative exemplary embodiment is similar to the previous exemplary embodiments in operation, however, there is a major difference in the method of engaging the pawls 241 to the floor anchor plate 210. The floor anchor plate 210 has longitudinal channels 213, however, these channels 213 are not provided with slots as in the previous embodiments at 12 and 112. The pawl locking arms 244, therefore, have no slots to engage. The locking action is accomplished by distortion of the channels 213 by the pawls 241 as shown in FIG. 13. A stopping flange 222 is formed on the buckle plate 220 to ensure that the pawls do not move longitudinally off of the buckle plate 220 as would be the case if the pawl tabs 221 were unable to support the force applied by the seat anchor plate 230 against the pawls 241. The seat anchor plate head 231 has an entirely different shape from the wedge shaped heads 31 and 131 of the previous exemplary embodiments. The head 231 of the seat anchor plate 230 has a nose shaped projection 232 for forcing the pawls 241 into deforming engagement with the channels 213 by contacting pawl surfaces 246. The seat anchor plate head 231 has stopping surfaces 235 to prevent the seat anchor plate 230 from forcing the pawls 241 past the desired deforming configuration with the floor anchor channels 213. This particular alternative exemplary embodiment has the advantage of absorbing energy from the emergency restraint system as the walls of the anchor plate channels 213 are deformed. This has the effect of attenuating restraint forces felt by a seat occupant. The deformation of the channels 213 occurs over a longer period of time relative a latching action such as that of the previous exemplary embodiments thereby lessening the initial restraint shock felt by the seat occupant. However, this exemplary embodiment is similar to the first preferred embodiment in that it is not releasably locking. This provides for the application of only one emergency restraining force in excess of a predetermined amount to render the adjustable emergency locking anchoring means nonadjustable.

All three exemplary embodiments provide for a system which allows the convenience of having the safety restraint buckle located in the same easily accessible position during fore and aft adjustment of the seat while providing the safety of an anchor system which is anchored to the floor of the vehicle during application of emergency restraining forces.

It is understood that the present invention has been disclosed by reference to three particular and preferred exemplary embodiments thereof, and modifications and design changes may be made to the disclosed embodiments without departing from the scope of the invention.

I claim:

1. An adjustable emergency locking anchor means for mounting a safety restraint buckle at a substantially fixed location relative to an adjustable vehicle seat to be maintained adjacent to a seat occupant's hip during fore and aft adjustment of said seat, said adjustable emergency locking anchor means comprising:
   floor anchor means for securing said buckle to said vehicle floor only upon application of an emergency restraining force in excess of a predetermined amount to said buckle; and
   seat anchor means adjustably attached to said floor anchor means at one end and connected to said buckle on the other end for securing said buckle to said seat during application of normal restraining forces less than said predetermined amount;
   locking means between said floor anchor and said seat anchor means for locking said floor anchor to said seat anchor;
   means responsive to said emergency restraining force for actuating said locking means, whereby said buckle is maintained in the same position relative to said occupant's hip as said seat is adjustably moved fore and aft and is secured to said floor upon application of an emergency restraining force on said buckle relative said seat of an amount in excess of a predetermined amount.

2. The adjustable emergency locking anchoring means of claim 1 wherein said floor anchor means includes a floor anchor plate having a longitudinal channel for slidably mounting said seat anchor means.

3. The adjustable emergency locking anchoring means of claim 2 wherein said seat anchor means comprises:
   buckle plate having one end attached to said buckle and the other end slidably mounted to said floor anchor plate;
   seat anchor plate superposedly mounted on said buckle plate having one end attached to said seat and the other end contacting said locking means, said seat anchor plate being mounted for relative longitudinal movement with respect to said buckle plate against said locking means, said relative movement resulting from extension of said buckle plate relative to said seat whereby said relative movement actuates said locking means; and
   wherein said means responsive to said emergency restraining force for actuating said locking means includes blocking means for preventing said relative movement of said seat anchor plate except upon application of an emergency restraining force on said buckle relative said seat of an amount in excess of a predetermined amount.

4. The adjustable emergency locking anchoring means of claim 3 wherein said locking means comprises:
   pawl means attached to said buckle plate for engaging said floor anchor plate, said pawl means being positioned so that said relative movement of said seat anchor plate movably contacts said pawl means into engagement with said floor anchor plate thereby locking said buckle plate to said floor anchor plate; and
   wherein said blocking means includes a means for retaining said pawl means out of engagement with said floor anchor plate until said pawl means are movably acted upon by said seat anchor plate.

5. The adjustable emergency locking anchoring means of claim 4 wherein said blocking means is frangible and will break only upon application of an emergency restraining force on said buckle relative said seat of an amount excess of a predetermined amount.

6. The adjustable emergency locking anchoring means of claim 4 wherein said blocking means is spring biased to allow said relative movement of said seat anchor plate only upon application of an emergency restraining force on said buckle relative said seat of an amount in excess of a predetermined amount.

7. The adjustable emergency locking anchoring means of claim 4 wherein said pawl retaining means is frangible.

8. The adjustable emergency locking anchoring means of claim 4 wherein said pawl retaining means is spring biased.

9. An adjustable emergency locking anchor means for mounting a safety restraint buckle at a substantially fixed location relative to an adjustable vehicle seat to be maintained adjacent to a seat occupant's hip during fore and aft adjustment of said seat, said adjustable emergency locking anchor means comprising:
 a pair of relatively telescoping mounting members, a first member of said pair being secured to the vehicle floor adjacent the path of travel of said seat and a second member of said pair being secured to said buckle;
 means for connecting said second member to said seat for normal concurrent movement to maintain said buckle adjacent said seat occupant's hip during fore and aft seat movement along said path of travel; and
 locking means for restricting relative telescoping movement of said member; and
 means for actuating said locking means when an emergency restraint force in excess of a predetermined amount is applied to said buckle.

10. The adjustable emergency locking anchor of claim 9 wherein said locking means comprises:
 pawl means mounted on said second member for engaging said first member thereby restricting said relative telescoping movement;
 retaining means for preventing said pawl means from engaging said first member except upon application of an emergency restraining force in excess of a predetermined amount to said buckle.

11. The adjustable emergency locking anchor of claim 10 wherein said connecting means includes a seat anchor plate having one end secured to said seat and the other end movably connected to said second member for movement relative to said second member in one direction only, said movement causing said pawl means to engage said first member and said movement only ocurring upon application of an emergency restraining force on said buckle relative said seat of an amount in excess of a predetermined amount.

* * * * *